(No Model.)

E. A. SPERRY.
SYSTEM OF ELECTRICAL DISTRIBUTION FOR MINES.

No. 446,030. Patented Feb. 10, 1891.

Witnesses:
Celerie P. Chapman
Francis M. Ireland

Inventor
Elmer A. Sperry
By Francis W. Parker
Attorney

UNITED STATES PATENT OFFICE.

ELMER A. SPERRY, OF CHICAGO, ILLINOIS, ASSIGNOR TO THE SPERRY ELECTRIC MINING MACHINE COMPANY, OF SAME PLACE.

SYSTEM OF ELECTRICAL DISTRIBUTION FOR MINES.

SPECIFICATION forming part of Letters Patent No. 446,030, dated February 10, 1891.

Application filed April 1, 1889. Serial No. 305,582. (No model.) Patented in Belgium April 20, 1889, No. 89,909.

*To all whom it may concern:*

Be it known that I, ELMER A. SPERRY, a citizen of the United States, residing at Chicago, in the county of Cook and State of Illinois, have invented a new and useful Improvement in Systems of Electrical Distribution for Mines, (for which I have obtained Letters Patent of Belgium, No. 89,909, dated April 20, 1889,) of which the following is a clear and exact specification.

My invention relates to systems of electrical distribution for mines for the operation of electrically-propelled cars and the like and for the operation of electrical mining-machines and the like.

The object is to provide a cheap, simple, and practical method of electrical distribution. This object I accomplish in the manner illustrated in the accompanying drawings, wherein—

Figure 1:
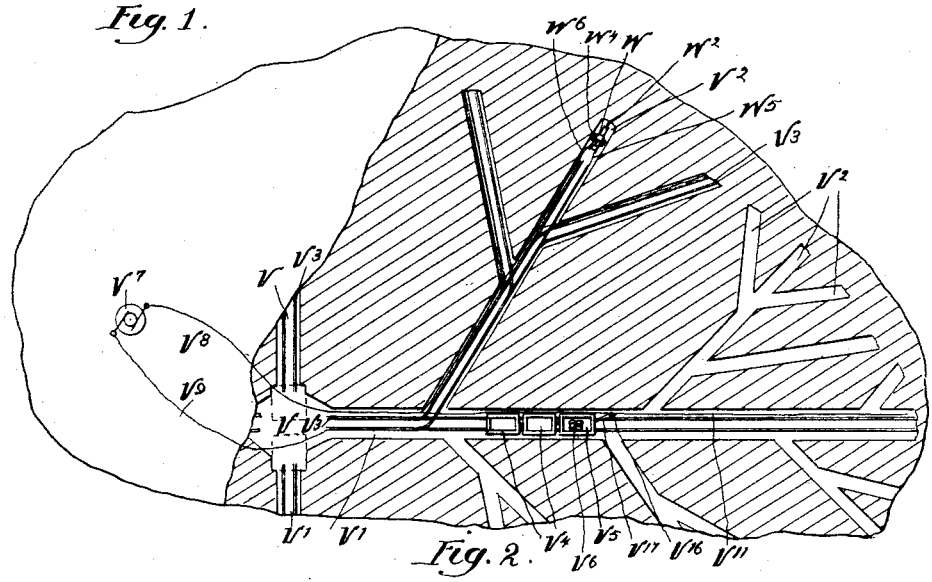
Figure 2:
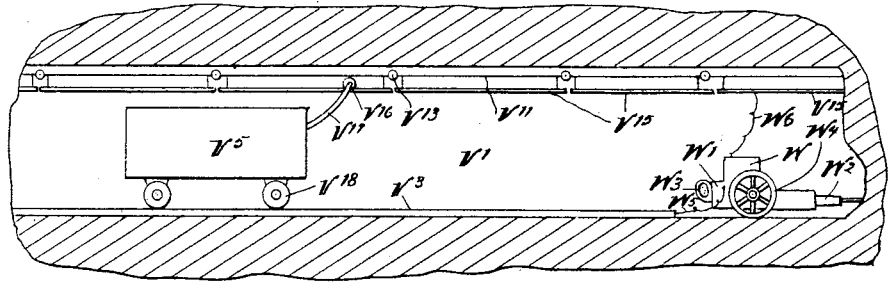
Figure 3:
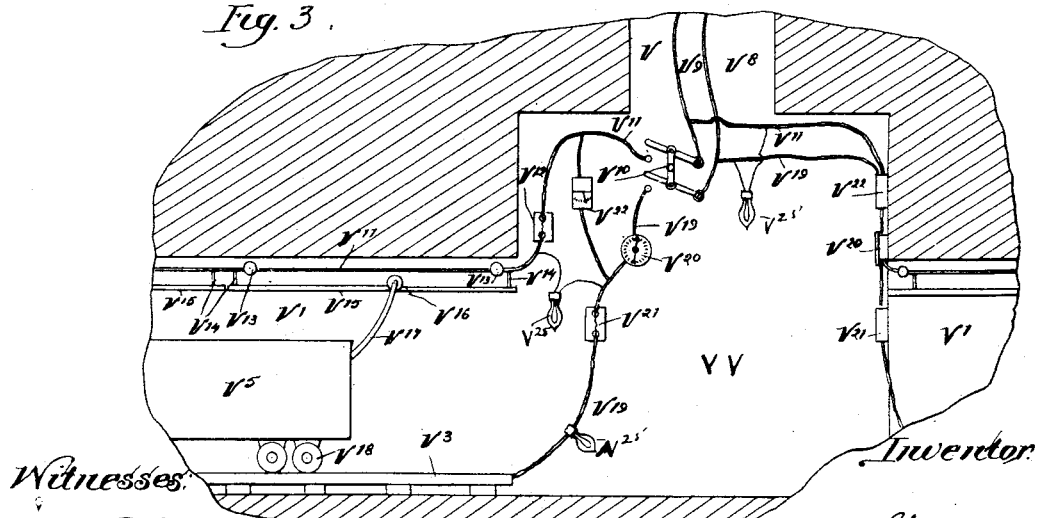

Figure 1 is a plan view of a portion of a mine and a portion of the surface of the earth above the same. Fig. 2 is a section of one of the main leads in the mine, and Fig. 3 is a sectional view showing the base of the shaft and leads running therefrom.

Like parts are indicated by the same letter in all of the figures.

V is the shaft terminating in the enlarged shaft-base V V.

V' V' are the main leads running from the shaft in various directions. $V^2$ $V^2$ are the branch leads therefrom divided up and running in such directions as circumstances may require.

$V^3$ $V^3$ are the metallic rails of the track running through the various leads and used for the purpose of the passage of the electrically-propelled cars and their transporting devices. $V^4$ $V^4$ are freight-cars adapted to run on such tracks, and $V^5$ the electrically-actuated cars or motors for such train. They may be provided, for example, each with an electric motor $V^6$.

$V^7$ is a dynamo, preferably on the surface of the earth above, from which lead the wires $V^8$ and $V^9$ through the shaft down to the base of such shaft and preferably to the two arms of the double-pole switch $V^{10}$. $V^{11}$ is a conductor leading from one of the contact-points of such switch through the fuse-box $V^{12}$ into one of the main leads V', being supported at suitable points on the insulators $V^{13}$ $V^{13}$. From this wire or conductor is supported, by the links $V^{14}$ $V^{14}$, the rod $V^{15}$, upon which rides the roller $V^{16}$ on the trolley $V^{17}$ from the motor-car $V^5$. $V^{18}$ are the trucks of such car which make contact with the rails $V^3$. A conductor leads from the trucks along the trolley $V^{17}$ to the roller $V^{16}$, thence to the rod $V^{15}$, links $V^{14}$, conductor $V^{11}$ to the switch, and thence to conductor $V^9$ and to one pole of the dynamo. From the other pole of the dynamo leads the conductor $V^8$ to the switch $V^{10}$, and when the switch is in operative position this conductor makes contact with the conductor $V^{19}$, which passes through the ampere-meter $V^{20}$, fuse-box $V^{21}$, and thence to the rail $V^3$.

$V^{22}$ is a volt-meter coupled between the conductors $V^{11}$ and $V^{19}$.

The rods $V^{15}$ $V^{15}$, on which the roller $V^{16}$ moves, are relatively short, so as to form sections, as shown, and any defect in either section can be remedied by the removal thereof or from circuit without interfering with the others. Similar conductors $V^{11}$ $V^{19}$ pass in from the wires $V^9$ and $V^8$ into each of the main leads, and they are provided with similar fuse-boxes $V^{12}$ $V^{21}$ and volt-meters $V^{22}$ and ampere-meters $V^{20}$.

W is the mining-machine, containing an electric motor W', a drill $W^2$, actuated thereby, handle $W^3$, and wheels $W^4$. The motor is connected at one pole by the conductor $W^5$ with the rail $V^3$ and at the pole by the conductor $W^6$ with the rod $V^{15}$ or conductor $V^{11}$.

$V^{25}$ $V^{25}$ are lights coupled between the rail and conductor or in series.

The use and operation of my invention are as follows: The generator $V^7$ being set in operation, a current will pass over all of the connected portions of the electrical system. If now the translating devices—as, for instance, motor-cars, mining-machines, &c.—be coupled between the two conductors in the leads—as, for example, between the rods $V^{15}$ and the rails $V^3$—a current will pass through and energize such translating devices and set the motor in motion and the mining-machine and the lights in operation. Either of the leads passing from the shaft-base V V can be thrown in or out of circuit by the operation of the four-point switch V¹⁰, one of which switches controls each of such leads.

The arrangement of devices as shown permits of the employment of the rails which are required for the cars in lieu of one of the conductors, and hence makes it possible to operate the system by running one wire in each of the leads. The electrical apparatus shown at the base of the shaft and used to connect the wires in the main leads with the shaft-conductors are for the purpose of being able to detect upon each of the main-lead conductors a fault existing, so that it may be quickly disconnected and the rest of the system saved in an operative condition rather than be plunged in darkness and inoperation.

I claim—

In a system of electrical distribution for mines, the main conductor leading down the main entries, branch conductors leading down the butt-entries derived from said main conductors, and ammeters located at the junctions thus formed, in combination with machines for both mining and transporting, deriving their energy from the same wires.

ELMER A. SPERRY.

Witnesses:
FRANCIS W. PARKER,
CELESTE P. CHAPMAN.